United States Patent
Thapar (10) Patent No.: US 9,843,621 B2
(45) Date of Patent: Dec. 12, 2017

(54) CALENDARING ACTIVITIES BASED ON COMMUNICATION PROCESSING

(71) Applicant: CISCO TECHNOLOGY, INC., San Jose, CA (US)

(72) Inventor: Raman Thapar, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 198 days.

(21) Appl. No.: 13/897,186

(22) Filed: May 17, 2013

(65) Prior Publication Data
US 2014/0343936 A1 Nov. 20, 2014

(51) Int. Cl.
| | |
|---|---|
| *G10L 15/26* | (2006.01) |
| *H04L 29/08* | (2006.01) |
| *H04L 29/06* | (2006.01) |
| *H04L 12/18* | (2006.01) |
| *G06Q 10/10* | (2012.01) |

(52) U.S. Cl.
CPC ......... *H04L 67/10* (2013.01); *G06Q 10/109* (2013.01); *H04L 12/1818* (2013.01); *H04L 65/1069* (2013.01); *H04L 65/4023* (2013.01); *H04L 67/141* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 2,911,462 | A | 11/1959 | Brady |
| 3,793,489 | A | 2/1974 | Sank |
| 3,909,121 | A | 9/1975 | De Mesquita Cardoso |
| 4,400,724 | A | 8/1983 | Fields |
| 4,473,285 | A | 9/1984 | Winter |
| 4,494,144 | A | 1/1985 | Brown |
| 4,750,123 | A | 6/1988 | Christian |

(Continued)

FOREIGN PATENT DOCUMENTS

FI  WO 2011151502 A1 * 12/2011 ............. G06F 3/167

OTHER PUBLICATIONS

Stephen Mayhew, "Canada to eavesdrop at airports, border crossing," Jun. 19, 2012, ©2012 Biometrics Research Group, Inc., 2 pages; http://www.biometricupdate.com/201206/canada-to-eavesdrop-at-airports-border-crossings/.

(Continued)

*Primary Examiner* — Richa Mishra (57) ABSTRACT

A method is provided in one embodiment and includes establishing a communication session involving a first endpoint and a second endpoint that are associated with a session, the first endpoint being associated with a first identifier and the second endpoint being associated with a second identifier. The method also includes evaluating first data for the first endpoint; evaluating second data for the second point; and determining whether to initiate a calendaring activity based, at least in part, on the first data and the second data. In more specific embodiments, the method includes evaluating a first availability associated with the first endpoint; evaluating a second availability associated with the second endpoint; and suggesting a future meeting based, at least in part, on the first availability and the second availability.

16 Claims, 3 Drawing Sheets

(56) References Cited

U.S. PATENT DOCUMENTS

| | | |
|---|---|---|
| 4,815,132 A | 3/1989 | Minami |
| 4,827,253 A | 5/1989 | Maltz |
| 4,853,764 A | 8/1989 | Sutter |
| 4,890,314 A | 12/1989 | Judd et al. |
| 4,961,211 A | 10/1990 | Tsugane et al. |
| 4,994,912 A | 2/1991 | Lumelsky et al. |
| 5,003,532 A | 3/1991 | Ashida et al. |
| 5,020,098 A | 5/1991 | Celli |
| 5,136,652 A | 8/1992 | Jibbe et al. |
| 5,187,571 A | 2/1993 | Braun et al. |
| 5,200,818 A | 4/1993 | Neta et al. |
| 5,249,035 A | 9/1993 | Yamanaka |
| 5,255,211 A | 10/1993 | Redmond |
| 5,268,734 A | 12/1993 | Parker et al. |
| 5,317,405 A | 5/1994 | Kuriki et al. |
| 5,337,363 A | 8/1994 | Platt |
| 5,347,363 A | 9/1994 | Yamanaka |
| 5,351,067 A | 9/1994 | Lumelsky et al. |
| 5,359,362 A | 10/1994 | Lewis et al. |
| 5,406,326 A | 4/1995 | Mowry |
| 5,423,554 A | 6/1995 | Davis |
| 5,446,834 A | 8/1995 | Deering |
| 5,448,287 A | 9/1995 | Hull |
| 5,467,401 A | 11/1995 | Nagamitsu et al. |
| 5,502,481 A | 3/1996 | Dentinger et al. |
| 5,502,726 A | 3/1996 | Fischer |
| 5,506,604 A | 4/1996 | Nally et al. |
| 5,532,737 A | 7/1996 | Braun |
| 5,541,639 A | 7/1996 | Takatsuki et al. |
| 5,541,773 A | 7/1996 | Kamo et al. |
| 5,570,372 A | 10/1996 | Shaffer |
| 5,572,248 A | 11/1996 | Allen et al. |
| 5,587,726 A | 12/1996 | Moffat |
| 5,612,733 A | 3/1997 | Flohr |
| 5,625,410 A | 4/1997 | Washino et al. |
| 5,666,153 A | 9/1997 | Copeland |
| 5,673,401 A | 9/1997 | Volk et al. |
| 5,675,374 A | 10/1997 | Kohda |
| 5,715,377 A | 2/1998 | Fukushima et al. |
| 5,729,471 A | 3/1998 | Jain et al. |
| 5,737,011 A | 4/1998 | Lukacs |
| 5,748,121 A | 5/1998 | Romriell |
| 5,760,826 A | 6/1998 | Nayar |
| 5,790,182 A | 8/1998 | Hilaire |
| 5,796,724 A | 8/1998 | Rajamani et al. |
| 5,815,196 A | 9/1998 | Alshawi |
| 5,818,514 A | 10/1998 | Duttweiler et al. |
| 5,821,985 A | 10/1998 | Iizawa |
| 5,889,499 A | 3/1999 | Nally et al. |
| 5,894,321 A | 4/1999 | Downs et al. |
| 5,940,118 A | 8/1999 | Van Schyndel |
| 5,940,530 A | 8/1999 | Fukushima et al. |
| 5,953,052 A | 9/1999 | McNelley et al. |
| 5,956,100 A | 9/1999 | Gorski |
| 6,069,658 A | 5/2000 | Watanabe |
| 6,088,045 A | 7/2000 | Lumelsky et al. |
| 6,097,441 A | 8/2000 | Allport |
| 6,101,113 A | 8/2000 | Paice |
| 6,124,896 A | 9/2000 | Kurashige |
| 6,148,092 A | 11/2000 | Qian |
| 6,167,162 A | 12/2000 | Jacquin et al. |
| 6,172,703 B1 | 1/2001 | Lee |
| 6,173,069 B1 | 1/2001 | Daly et al. |
| 6,226,035 B1 | 5/2001 | Korein et al. |
| 6,243,130 B1 | 6/2001 | McNelley et al. |
| 6,249,318 B1 | 6/2001 | Girod et al. |
| 6,256,400 B1 | 7/2001 | Takata et al. |
| 6,266,098 B1 | 7/2001 | Cove et al. |
| 6,285,392 B1 | 9/2001 | Satoda et al. |
| 6,292,575 B1 | 9/2001 | Bortolussi et al. |
| 6,356,589 B1 | 3/2002 | Gebler et al. |
| 6,380,539 B1 | 4/2002 | Edgar |
| 6,424,377 B1 | 7/2002 | Driscoll, Jr. |
| 6,430,222 B1 | 8/2002 | Okadia |
| 6,462,767 B1 | 10/2002 | Obata et al. |
| 6,493,032 B1 | 12/2002 | Wallerstein et al. |
| 6,507,356 B1 | 1/2003 | Jackel et al. |
| 6,573,904 B1 | 6/2003 | Chun et al. |
| 6,577,333 B2 | 6/2003 | Tai et al. |
| 6,583,808 B2 | 6/2003 | Boulanger et al. |
| 6,590,603 B2 | 7/2003 | Sheldon et al. |
| 6,591,314 B1 | 7/2003 | Colbath |
| 6,593,955 B1 | 7/2003 | Falcon |
| 6,593,956 B1 | 7/2003 | Potts et al. |
| 6,611,281 B2 | 8/2003 | Strubbe |
| 6,680,856 B2 | 1/2004 | Schreiber |
| 6,693,663 B1 | 2/2004 | Harris |
| 6,694,094 B2 | 2/2004 | Partynski et al. |
| 6,704,048 B1 | 3/2004 | Malkin et al. |
| 6,710,797 B1 | 3/2004 | McNelley et al. |
| 6,751,106 B2 | 6/2004 | Zhang et al. |
| 6,763,226 B1 | 7/2004 | McZeal |
| 6,768,722 B1 | 7/2004 | Katseff et al. |
| 6,771,303 B2 | 8/2004 | Zhang et al. |
| 6,774,927 B1 | 8/2004 | Cohen et al. |
| 6,795,108 B2 | 9/2004 | Jarboe et al. |
| 6,795,558 B2 | 9/2004 | Matsuo et al. |
| 6,798,834 B1 | 9/2004 | Murakami et al. |
| 6,806,898 B1 | 10/2004 | Toyama et al. |
| 6,807,280 B1 | 10/2004 | Stroud et al. |
| 6,831,653 B2 | 12/2004 | Kehlet et al. |
| 6,844,990 B2 | 1/2005 | Artonne et al. |
| 6,850,266 B1 | 2/2005 | Trinca |
| 6,853,398 B2 | 2/2005 | Malzbender et al. |
| 6,867,798 B1 | 3/2005 | Wada et al. |
| 6,882,358 B1 | 4/2005 | Schuster et al. |
| 6,888,358 B2 | 5/2005 | Lechner et al. |
| 6,909,438 B1 | 6/2005 | White et al. |
| 6,911,995 B2 | 6/2005 | Ivanov et al. |
| 6,917,271 B2 | 7/2005 | Zhang et al. |
| 6,963,653 B1 | 11/2005 | Miles |
| 6,980,526 B2 | 12/2005 | Jang et al. |
| 6,985,178 B1 | 1/2006 | Morita et al. |
| 6,989,754 B2 | 1/2006 | Kiscanin et al. |
| 6,989,836 B2 | 1/2006 | Ramsey |
| 6,989,856 B2 | 1/2006 | Firestone et al. |
| 6,990,086 B1 | 1/2006 | Holur et al. |
| 7,002,973 B2 | 2/2006 | MeLampy et al. |
| 7,023,855 B2 | 4/2006 | Haumont et al. |
| 7,028,092 B2 | 4/2006 | MeLampy et al. |
| 7,031,311 B2 | 4/2006 | MeLampy et al. |
| 7,043,528 B2 | 5/2006 | Schmitt et al. |
| 7,046,862 B2 | 5/2006 | Ishizaka et al. |
| 7,057,636 B1 | 6/2006 | Cohen-Solal et al. |
| 7,057,662 B2 | 6/2006 | Malzbender |
| 7,061,896 B2 | 6/2006 | Jabbari et al. |
| 7,072,504 B2 | 7/2006 | Miyano et al. |
| 7,072,833 B2 | 7/2006 | Rajan |
| 7,080,157 B2 | 7/2006 | McCanne |
| 7,092,002 B2 | 8/2006 | Ferren et al. |
| 7,095,455 B2 | 8/2006 | Jordan et al. |
| 7,111,045 B2 | 9/2006 | Kato et al. |
| 7,126,627 B1 | 10/2006 | Lewis et al. |
| 7,131,135 B1 | 10/2006 | Virag et al. |
| 7,136,651 B2 | 11/2006 | Kalavade |
| 7,139,767 B1 | 11/2006 | Taylor et al. |
| 7,158,674 B2 | 1/2007 | Suh |
| 7,161,942 B2 | 1/2007 | Chen et al. |
| 7,197,008 B1 | 3/2007 | Shabtay et al. |
| 7,221,260 B2 | 5/2007 | Berezowski et al. |
| 7,239,338 B2 | 7/2007 | Krisbergh et al. |
| 7,246,118 B2 | 7/2007 | Chastain et al. |
| 7,269,292 B2 | 9/2007 | Steinberg |
| 7,274,555 B2 | 9/2007 | Kim et al. |
| 7,336,299 B2 | 2/2008 | Kostrzewski |
| 7,352,809 B2 | 4/2008 | Wenger et al. |
| 7,353,279 B2 | 4/2008 | Durvasula et al. |
| 7,359,731 B2 | 4/2008 | Choksi |
| 7,399,095 B2 | 7/2008 | Rondinelli |
| 7,411,975 B1 | 8/2008 | Mohaban |
| 7,413,150 B1 | 8/2008 | Hsu |
| 7,428,000 B2 | 9/2008 | Cutler et al. |
| 7,440,615 B2 | 10/2008 | Gong et al. |
| 7,450,134 B2 | 11/2008 | Maynard et al. |

(56) References Cited

U.S. PATENT DOCUMENTS

| | | |
|---|---|---|
| 7,471,320 B2 | 12/2008 | Malkin et al. |
| 7,477,657 B1 | 1/2009 | Murphy et al. |
| 7,505,036 B1 | 3/2009 | Baldwin |
| 7,518,051 B2 | 4/2009 | Redmann |
| 7,529,425 B2 | 5/2009 | Kitamura et al. |
| 7,532,230 B2 | 5/2009 | Culbertson et al. |
| 7,532,232 B2 | 5/2009 | Shah et al. |
| 7,534,056 B2 | 5/2009 | Cross et al. |
| 7,545,761 B1 | 6/2009 | Kalbag |
| 7,551,432 B1 | 6/2009 | Bockheim et al. |
| 7,555,141 B2 | 6/2009 | Mori |
| 7,575,537 B2 | 8/2009 | Ellis |
| 7,577,246 B2 | 8/2009 | Idan et al. |
| 7,607,101 B1 | 10/2009 | Barrus |
| 7,616,226 B2 | 11/2009 | Roessler et al. |
| 7,623,115 B2 | 11/2009 | Marks |
| 7,624,417 B2 | 11/2009 | Dua |
| 7,646,419 B2 | 1/2010 | Cernasov |
| 7,679,639 B2 | 3/2010 | Harrell et al. |
| 7,692,680 B2 | 4/2010 | Graham et al. |
| 7,707,247 B2 | 4/2010 | Dunn et al. |
| 7,710,448 B2 | 5/2010 | De Beer et al. |
| 7,710,450 B2 | 5/2010 | Dhuey et al. |
| 7,714,222 B2 | 5/2010 | Taub et al. |
| 7,715,657 B2 | 5/2010 | Lin et al. |
| 7,716,283 B2 | 5/2010 | Thukral |
| 7,719,605 B2 | 5/2010 | Hirasawa et al. |
| 7,719,662 B2 | 5/2010 | Bamji et al. |
| 7,720,277 B2 | 5/2010 | Hattori |
| 7,725,919 B1 | 5/2010 | Thiagarajan et al. |
| 7,738,457 B2 | 6/2010 | Nordmark et al. |
| 7,813,724 B2 | 10/2010 | Gronner et al. |
| 7,839,434 B2 | 11/2010 | Ciudad et al. |
| 7,855,726 B2 | 12/2010 | Ferren et al. |
| 7,861,189 B2 | 12/2010 | Watanabe et al. |
| 7,886,048 B1 | 2/2011 | Holland et al. |
| 7,889,851 B2 | 2/2011 | Shah et al. |
| 7,890,888 B2 | 2/2011 | Glasgow et al. |
| 7,894,531 B1 | 2/2011 | Cetin et al. |
| 7,899,265 B1 | 3/2011 | Rostami |
| 7,920,158 B1 | 4/2011 | Beck et al. |
| 8,000,559 B2 | 8/2011 | Kwon |
| 8,077,857 B1 | 12/2011 | Lambert |
| 8,081,346 B1 | 12/2011 | Anup et al. |
| 8,086,076 B2 | 12/2011 | Tian et al. |
| 8,135,068 B1 | 3/2012 | Alvarez |
| 8,179,419 B2 | 5/2012 | Girish et al. |
| 8,219,404 B2 | 7/2012 | Weinberg et al. |
| 8,259,155 B2 | 9/2012 | Marathe et al. |
| 8,289,363 B2 | 10/2012 | Buckler |
| 8,294,747 B1 | 10/2012 | Weinberg et al. |
| 8,299,979 B2 | 10/2012 | Rambo et al. |
| 8,315,466 B2 | 11/2012 | El-Maleh et al. |
| 8,363,719 B2 | 1/2013 | Nakayama |
| 8,436,888 B1 | 5/2013 | Baldino et al. |
| 8,472,415 B2 | 6/2013 | Yegani et al. |
| 8,477,175 B2 | 7/2013 | Shaffer et al. |
| 8,542,264 B2 | 9/2013 | Lu et al. |
| 8,588,758 B2 | 11/2013 | Ullrich |
| 8,614,735 B2 | 12/2013 | Buckler |
| 8,659,637 B2 | 2/2014 | De Beer et al. |
| 8,659,639 B2 | 2/2014 | Baldino et al. |
| 8,670,019 B2 | 3/2014 | Byers |
| 8,692,862 B2 | 4/2014 | N'Guessan |
| 8,699,457 B2 | 4/2014 | Venkataswami et al. |
| 8,723,914 B2 | 5/2014 | Mackie et al. |
| 8,730,297 B2 | 5/2014 | Fornell et al. |
| 8,786,631 B1 | 7/2014 | Collins |
| 2002/0047892 A1 | 4/2002 | Gonsalves |
| 2002/0106120 A1 | 8/2002 | Brandenburg et al. |
| 2002/0108125 A1 | 8/2002 | Joao |
| 2002/0114392 A1 | 8/2002 | Sekiguchi et al. |
| 2002/0118890 A1 | 8/2002 | Rondinelli |
| 2002/0131608 A1 | 9/2002 | Lobb et al. |
| 2002/0140804 A1 | 10/2002 | Colmenarez et al. |
| 2002/0149672 A1 | 10/2002 | Clapp et al. |
| 2002/0186528 A1 | 12/2002 | Huang |
| 2002/0196737 A1 | 12/2002 | Bullard |
| 2003/0017872 A1 | 1/2003 | Oishi et al. |
| 2003/0048218 A1 | 3/2003 | Milnes et al. |
| 2003/0071932 A1 | 4/2003 | Tanigaki |
| 2003/0072460 A1 | 4/2003 | Gonopolskiy et al. |
| 2003/0160861 A1 | 8/2003 | Barlow et al. |
| 2003/0179285 A1 | 9/2003 | Naito |
| 2003/0185303 A1 | 10/2003 | Hall |
| 2003/0197687 A1 | 10/2003 | Shetter |
| 2003/0220971 A1 | 11/2003 | Kressin |
| 2004/0003411 A1 | 1/2004 | Nakai et al. |
| 2004/0032906 A1 | 2/2004 | Lillig |
| 2004/0038169 A1 | 2/2004 | Mandelkern et al. |
| 2004/0061787 A1 | 4/2004 | Liu et al. |
| 2004/0091232 A1 | 5/2004 | Appling, III |
| 2004/0118984 A1 | 6/2004 | Kim et al. |
| 2004/0119814 A1 | 6/2004 | Clisham et al. |
| 2004/0164858 A1 | 8/2004 | Lin |
| 2004/0165060 A1 | 8/2004 | McNelley et al. |
| 2004/0178955 A1 | 9/2004 | Menache et al. |
| 2004/0189463 A1 | 9/2004 | Wathen |
| 2004/0189676 A1 | 9/2004 | Dischert |
| 2004/0196250 A1 | 10/2004 | Mehrotra et al. |
| 2004/0207718 A1 | 10/2004 | Boyden et al. |
| 2004/0218755 A1 | 11/2004 | Marton et al. |
| 2004/0246962 A1 | 12/2004 | Kopeikin et al. |
| 2004/0246972 A1 | 12/2004 | Wang et al. |
| 2004/0254982 A1 | 12/2004 | Hoffman et al. |
| 2004/0260796 A1 | 12/2004 | Sundqvist et al. |
| 2005/0007954 A1 | 1/2005 | Sreemanthula et al. |
| 2005/0024484 A1 | 2/2005 | Leonard |
| 2005/0050246 A1 | 3/2005 | Lakkakorpi et al. |
| 2005/0081160 A1 | 4/2005 | Wee et al. |
| 2005/0110867 A1 | 5/2005 | Schulz |
| 2005/0117022 A1 | 6/2005 | Marchant |
| 2005/0129325 A1 | 6/2005 | Wu |
| 2005/0147257 A1 | 7/2005 | Melchior et al. |
| 2005/0248652 A1 | 11/2005 | Firestone et al. |
| 2005/0268823 A1 | 12/2005 | Bakker et al. |
| 2006/0013495 A1 | 1/2006 | Duan et al. |
| 2006/0017807 A1 | 1/2006 | Lee et al. |
| 2006/0028983 A1 | 2/2006 | Wright |
| 2006/0029084 A1 | 2/2006 | Grayson |
| 2006/0038878 A1 | 2/2006 | Takashima et al. |
| 2006/0066717 A1 | 3/2006 | Miceli |
| 2006/0072813 A1 | 4/2006 | Matsumoto et al. |
| 2006/0082643 A1 | 4/2006 | Richards |
| 2006/0093128 A1 | 5/2006 | Oxford |
| 2006/0100004 A1 | 5/2006 | Kim et al. |
| 2006/0104297 A1 | 5/2006 | Buyukkoc et al. |
| 2006/0104470 A1 | 5/2006 | Akino |
| 2006/0120307 A1 | 6/2006 | Sahashi |
| 2006/0120568 A1 | 6/2006 | McConville et al. |
| 2006/0125691 A1 | 6/2006 | Menache et al. |
| 2006/0126878 A1 | 6/2006 | Takumai et al. |
| 2006/0126894 A1 | 6/2006 | Mori |
| 2006/0152489 A1 | 7/2006 | Sweetser et al. |
| 2006/0152575 A1 | 7/2006 | Amiel et al. |
| 2006/0158509 A1 | 7/2006 | Kenoyer et al. |
| 2006/0168302 A1 | 7/2006 | Boskovic et al. |
| 2006/0170769 A1 | 8/2006 | Zhou |
| 2006/0181607 A1 | 8/2006 | McNelley et al. |
| 2006/0200518 A1 | 9/2006 | Sinclair et al. |
| 2006/0233120 A1 | 10/2006 | Eshel et al. |
| 2006/0256187 A1 | 11/2006 | Sheldon et al. |
| 2006/0284786 A1 | 12/2006 | Takano et al. |
| 2006/0289772 A1 | 12/2006 | Johnson et al. |
| 2007/0019621 A1 | 1/2007 | Perry et al. |
| 2007/0039030 A1 | 2/2007 | Romanowich et al. |
| 2007/0040903 A1 | 2/2007 | Kawaguchi |
| 2007/0070177 A1 | 3/2007 | Christensen |
| 2007/0080845 A1 | 4/2007 | Amand |
| 2007/0112966 A1 | 5/2007 | Eftis et al. |
| 2007/0120971 A1 | 5/2007 | Kennedy |
| 2007/0121353 A1 | 5/2007 | Zhang et al. |
| 2007/0140337 A1 | 6/2007 | Lim et al. |
| 2007/0153712 A1 | 7/2007 | Fry et al. |

(56) References Cited

U.S. PATENT DOCUMENTS

| | | |
|---|---|---|
| 2007/0159523 A1 | 7/2007 | Hillis et al. |
| 2007/0183661 A1 | 8/2007 | El-Maleh et al. |
| 2007/0188597 A1 | 8/2007 | Kenoyer et al. |
| 2007/0189219 A1 | 8/2007 | Navoli et al. |
| 2007/0192381 A1 | 8/2007 | Padmanabhan |
| 2007/0206091 A1 | 9/2007 | Dunn et al. |
| 2007/0206602 A1 | 9/2007 | Halabi et al. |
| 2007/0211716 A1 | 9/2007 | Oz et al. |
| 2007/0217406 A1 | 9/2007 | Riedel et al. |
| 2007/0217500 A1 | 9/2007 | Gao et al. |
| 2007/0229250 A1 | 10/2007 | Recker et al. |
| 2007/0247470 A1 | 10/2007 | Dhuey et al. |
| 2007/0250567 A1 | 10/2007 | Graham et al. |
| 2007/0250620 A1 | 10/2007 | Shah et al. |
| 2007/0273752 A1 | 11/2007 | Chambers et al. |
| 2007/0279483 A1 | 12/2007 | Beers et al. |
| 2007/0279484 A1 | 12/2007 | Derocher et al. |
| 2007/0285505 A1 | 12/2007 | Korneliussen |
| 2007/0291667 A1 | 12/2007 | Huber et al. |
| 2008/0043041 A2 | 2/2008 | Hedenstroem et al. |
| 2008/0044064 A1 | 2/2008 | His |
| 2008/0068446 A1 | 3/2008 | Barkley et al. |
| 2008/0069444 A1 | 3/2008 | Wilensky |
| 2008/0072334 A1* | 3/2008 | Bailey .................. G06Q 10/10 726/28 |
| 2008/0077390 A1 | 3/2008 | Nagao |
| 2008/0084429 A1 | 4/2008 | Wissinger |
| 2008/0136896 A1 | 6/2008 | Graham et al. |
| 2008/0151038 A1 | 6/2008 | Khouri et al. |
| 2008/0153537 A1 | 6/2008 | Khawand et al. |
| 2008/0167078 A1 | 7/2008 | Elbye |
| 2008/0198755 A1 | 8/2008 | Vasseur et al. |
| 2008/0208444 A1 | 8/2008 | Ruckart |
| 2008/0212677 A1 | 9/2008 | Chen et al. |
| 2008/0215974 A1 | 9/2008 | Harrison et al. |
| 2008/0218582 A1 | 9/2008 | Buckler |
| 2008/0219268 A1 | 9/2008 | Dennison |
| 2008/0232688 A1 | 9/2008 | Senior et al. |
| 2008/0232692 A1 | 9/2008 | Kaku |
| 2008/0240237 A1 | 10/2008 | Tian et al. |
| 2008/0240571 A1 | 10/2008 | Tian et al. |
| 2008/0246833 A1 | 10/2008 | Yasui et al. |
| 2008/0266380 A1 | 10/2008 | Gorzynski et al. |
| 2008/0267282 A1 | 10/2008 | Kalipatnapu et al. |
| 2008/0297586 A1 | 12/2008 | Kurtz et al. |
| 2008/0298571 A1 | 12/2008 | Kurtz et al. |
| 2008/0303901 A1 | 12/2008 | Variyath et al. |
| 2009/0003723 A1 | 1/2009 | Kokemohr |
| 2009/0009593 A1 | 1/2009 | Cameron et al. |
| 2009/0115723 A1 | 5/2009 | Henty |
| 2009/0129753 A1 | 5/2009 | Wagenlander |
| 2010/0228825 A1* | 9/2010 | Hegde .................. G06F 21/6218 709/204 |
| 2010/0302345 A1* | 12/2010 | Baldino et al. ............ 348/14.08 |
| 2012/0030194 A1* | 2/2012 | Jain .............................. 707/722 |
| 2012/0157067 A1* | 6/2012 | Turner et al. .................. 455/417 |
| 2012/0203551 A1* | 8/2012 | Lakshmanan ........ G06Q 10/109 704/235 |
| 2013/0204622 A1* | 8/2013 | Lu ........................... G06F 3/167 704/251 |
| 2013/0210392 A1* | 8/2013 | Woloshyn .................. 455/412.1 |
| 2013/0297317 A1* | 11/2013 | Lee .................... H04M 1/72552 704/270.1 |
| 2014/0164501 A1* | 6/2014 | Herger ..................... H04N 7/15 709/204 |

OTHER PUBLICATIONS

Apple, Inc., "iOS 6—Use your voice to do even more with Siri," ©2013 Apple, Inc., 11 pages; http://www.apple.com/iphone/features/siri.html.

Straight Dope, "Does voice-activated eavesdropping technology listen in on phone conversations for suspicious 'keywords'"?, ©2013 Sun-Times Media, LLC, 2 pages; http://www.straightdope.com/columns/read/2314/does-voice-activatedeavesdropping-technology-listen-in-on-phone-conversations-for-suspiciouskeywords.

* cited by examiner

CALENDARING ACTIVITIES BASED ON COMMUNICATION PROCESSING

TECHNICAL FIELD

This disclosure relates in general to the field of communications and, more particularly, to calendaring activities based on communication processing.

BACKGROUND

Communication services have become increasingly important in today's society. In certain architectures, service providers may seek to offer sophisticated conferencing services for their end users. The conferencing architecture can offer an "in-person" meeting experience over a network. Conferencing architectures can seek to deliver real-time, face-to-face interactions between people using advanced visual, audio, and collaboration technologies.

In many communications scenarios, participants organize future meetings, follow-up items, etc., although frequently participants forget to setup the meeting, or follow through with these plans. In other cases, participants may make mistakes in the agreed time and place when setting up the meeting. In yet other instances, a participant may become aware of facts (e.g., a deadline, a birthdate, an anniversary, etc.) during the session. The participant may intend for these dates/events to be saved for future reference, but ultimately forget to properly record them. Finding these items (e.g., using search tools) may not be possible depending on the mode of communication or, alternatively, finding these items may simply be cumbersome.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one embodiment and includes establishing a communication session involving a first endpoint and a second endpoint that are associated with a session, the first endpoint being associated with a first identifier and the second endpoint being associated with a second identifier. The method also includes evaluating first data for the first endpoint; evaluating second data for the second point; and determining whether to initiate a calendaring activity based, at least in part, on the first data and the second data. The 'first data' and the 'second data' can comprise any part of an exchange between two parties (e.g., a portion of a conversation). For example, such data can include audio data, video data, text, multi-media data, instant messaging data, graphics, pictures, email data, etc.

In more specific embodiments, the method includes evaluating a first availability associated with the first endpoint; evaluating a second availability associated with the second endpoint; and suggesting a future meeting based, at least in part, on the first availability and the second availability. The method can also include performing a speech to text analysis on at least a portion of the session in order to determine whether to initiate the calendaring activity. The method could also include assigning one or more follow-up items to a third endpoint that was not initially involved in the session, where the assigning is based, at least in part, on at least a portion of the session. In certain implementations, the method can include providing a pop-up window to offer a list of calendar options to the first endpoint and the second endpoint based, at least in part, on a portion of the session. In yet other examples, heuristics (e.g., histories of any kind) are used in order to determine whether to initiate the calendaring activity. Additionally, previously defined speech patterns can be used in order to determine whether to initiate the calendaring activity.

Example Embodiments

Figure 1:
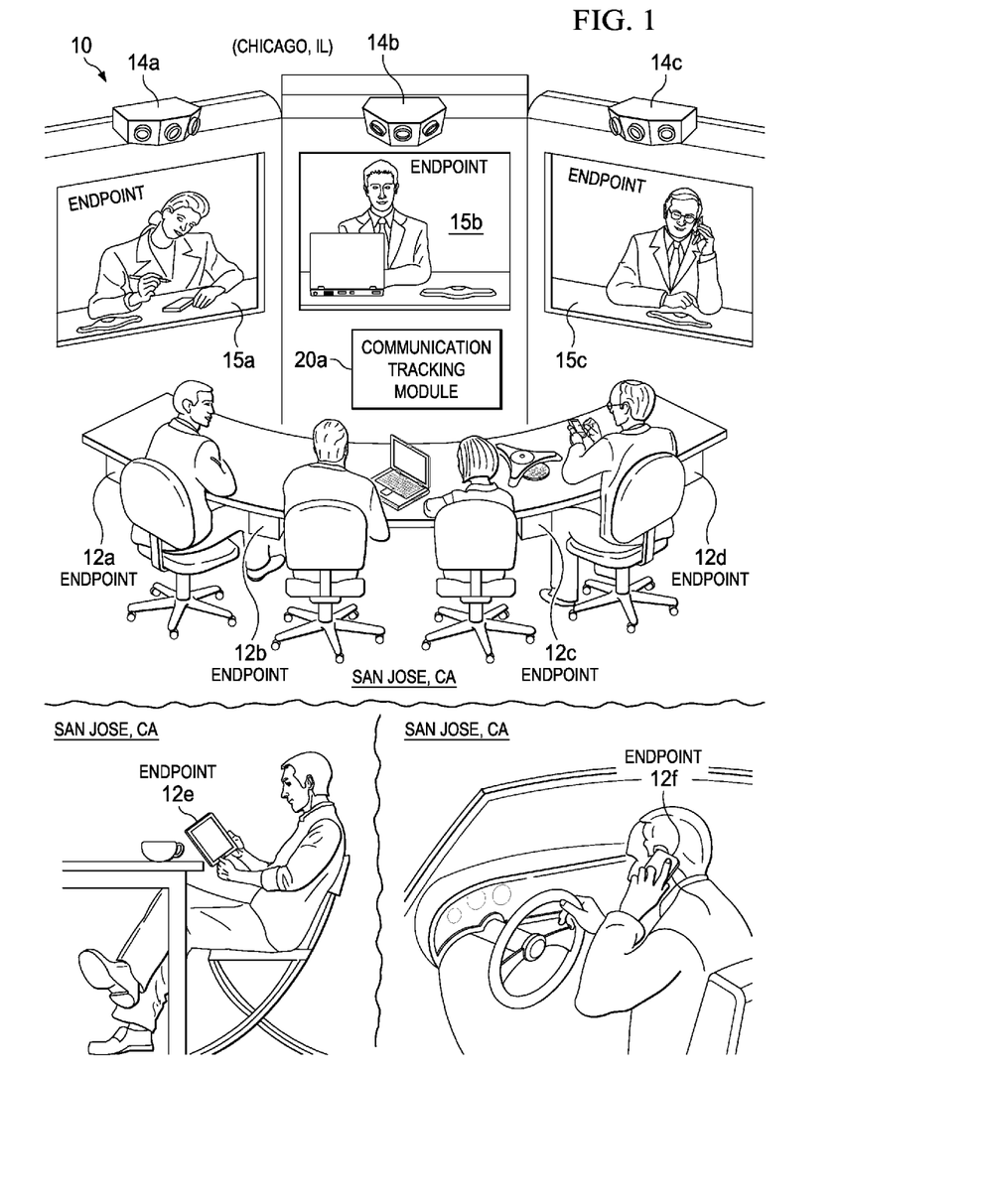
FIG. 1 is a simplified schematic diagram illustrating a communication system for providing calendaring activities in accordance with one embodiment of the present disclosure.

Turning to FIG. 1, FIG. 1 is a simplified schematic diagram illustrating a communication system 10 for providing calendaring activities in accordance with one example embodiment of the present disclosure. Communication system 10 can be configured to use language processing in audio, video, or text communication to automate the process of calendaring any number of items (e.g., meetings, reminders, tasks associated with a date or a time, etc.). This can provide for an automated meeting/resource scheduling tool that could be associated with any suitable technology (e.g., a Telepresence™ session, a WebEx™ meeting, instant messaging sessions, etc.). In certain scenarios, the architecture of FIG. 1 can provide a real-time determination of available times for attendees to participate in a future meeting.

Language processing can be used within a given session to identify key aspects of the dialogue and, subsequently, automatically generate meetings, reminders, events, task lists (to-do lists), meeting discussion topics, etc. The term "calendaring activities" generically compasses all such possibilities. Note that the automatic calendar activities can also apply to facts that surfaced during a conversation such as addresses, follow-up items, etc. all of which could be intelligently assigned to one or more contacts (either within or outside of the original session). The actual processing could be done in real-time (e.g., using a simple pop-up window), or provisioned at a more convenient time (e.g., at the end of the session in order to minimize interruptions during the meeting). In the case of former that involves real-time scheduling, this could obviate the need to later check availability amongst participants for follow-up meetings. Additionally, certain example scenarios can involve communication system 10 providing for automated reminder generation for birthdays, end-of-quarter deadlines, product ship dates, or any other relevant timeline, which may be personal or business in nature.

It should be noted that embodiments of the present disclosure can involve which actions to be taken based, at least in part, on the presence of one or more keywords, patterns of specific words, etc. For example, a set of actions can be derived from analyzing conversations in which an entire string of information is evaluated. The actions can include any suitable calendaring activities such as checking participant availability, setting up follow-up meetings, reminders based on meetings between individuals, assigning action items, etc. Hence, information that is extracted can be used to trigger workflows associated with any number of calendaring tools. Moreover, the architecture of the present disclosure can detect possible tasks based on conversations between individuals and, subsequently, automate those calendaring activities. For example, the system could list a number of potential automated options that it believes a given participant may want, where the participant can then decide if he/she would accept, modify, ignore, propose a new activity, etc. based on what was offered. Note that a given individual does not have to take any special action to be offered the list of options, which can include any number of suggestions, recommendations, etc.

Moreover, in using the calendaring activities, individuals will become more adept at taking advantage of its capabilities. Hence, during a given conversation (e.g., involving any suitable communication protocol), the end user would not have to continuously remember which subsequent meetings should be calendared, which follow-up action items should be addressed, etc. This could obviate the need for a specific individual to set up a follow-up meeting, check availabilities of other participants, gather information agendas, retrieve previous meeting minutes, etc. Furthermore, the system has access to the participants' contact information that allows for a quick calendaring entry involving any number of subsets of the participants. These subsets can be targeted based on the conversations that occurred during the original meeting. The participant information can be used to automatically suggest the next available timeslot, including suggesting a given location (e.g., by analyzing room availability that can accommodate particular technologies, the geographic information of the participants, etc.).

The architecture can have access to documents, recordings, stored information of any kind, etc. that it can send individuals to catch them up on previous meetings, meeting minutes, etc. Again, the system is offloading chores that would otherwise be relegated to a set of participants. Additionally, the system can continuously learn from speakers such that it becomes better at speaker recognition, conversation patterns, etc. The system can store speaker models in the system and, further, have those arranged by speaker IDs.

In one particular embodiment, the system would only take action on calendaring activities based on a two-way communication. For example, if Speaker 1 stated: "Let's meet tomorrow . . . ", the counterparty would need to respond in the affirmative for the system to prompt the user for possible scheduling activities. In another example, the system can prompt a user for setting up a meeting if a specific time is mentioned. In other cases, the system can create a vocabulary of terms that indicate which terms are signs of an affirmative response (culturally) to ensure that the rules are sufficiently narrow before a user is prompted.

Returning back to this particular example of FIG. 1, FIG. 1 includes multiple endpoints 12a-f associated with various end users of a session. In general, endpoints may be geographically separated, where in this particular example, endpoints 12a-d are located in San Jose, Calif. and a set of counterparty endpoints are located in Chicago, Ill. FIG. 1 includes a communication tracking module 20a coupled to endpoints 12a-d.

Semantically, and in the context of a session, a name, a speaker ID, a username, a company ID, and/or a location of a participant can be used by communication tracking module 20a to assign a virtual position to the end user. This can also be used to determine how to trigger the reminders, calendar entries, events, etc. In certain embodiments, communication system 10 is configured to utilize its intelligence to interface with any number of calendaring systems (e.g., Microsoft Outlook™, WebEx™, Jabber™, Apple email, or any other suitable calendaring technology). For example, consider a phone conversation taking place on Wednesday the 15th, which provides the following transcript (that could readily be generated by communication tracking module 20a, which may include a speech to text engine):

Speaker 1: So is Raman's birthday tomorrow?
Speaker 2: No, it is on Friday. OR
Speaker 2: Yes.

Communication system 10 would evaluate this information and subsequently ask either one (or both) of the speakers if they would like to have a calendar reminder for the correct birthday, along with a potential invitation to contact Raman (which could be linked to his contact information associated with a given e-mail technology).

Consider another example involving an email/chat conversation between two people on Wednesday the 15th:

User 1: Can we meet on Friday to discuss this?
User 2: Sure. Does 9 AM PT work for you?
User 1: Sure.

Again, communication system 10 could automatically request if the user(s) would like to set up a meeting for 9 AM PT on Friday the 15th with User 1 and User 2. This could be done during the conversation using a simple communication/a simple solicitation (e.g., a pop-up query, etc.), or once the conversation ends. User preferences can be designated by each individual, by the administrator, etc., where these preferences can be accessed at any appropriate time in order to render a decision as to when to coordinate calendar events, calendar reminders, etc.

In one particular embodiment, extensions of such a use case could be applicable to any number of products, technologies, etc. For example, at the end of a Telepresence™ or WebEx™ meeting, the architecture can automatically schedule a follow-up call and, further, alert participants in case they have conflicting meetings, they are on personal time off (PTO), etc. such that timeslots already in the calendar system would be honored.

In one example implementation, communication tracking module 20a can be configured to use basic speech, words, text, audio of any kind, and/or pattern-recognition to identify opportune times to trigger calendaring activities. Once a given segment is detected for analysis, communication tracking module 20a can begin initiating the provisioning of calendaring activities. Note that the behavior, speech patterns, history, etc. of the participants can be accounted for in suggesting the calendaring activities. Along similar lines, the exact data segments to be targeted for analysis can be based on user histories (where they exist), previous speech patterns, previous behaviors, etc. It should be noted that any number of heuristics may be used in conjunction with the present disclosure in order to facilitate its operations. The heuristics can be used to trigger the calendaring activities and/or used to determine which segments of sessions should be analyzed for providing such activities. Where no such historical information is present, the system would simply evaluate a given session based on its programmed intelligence for evaluating when to trigger calendaring activities.

It is imperative to note that communication system 10 can alternatively leverage other parameters of speech in order to execute the intelligent reminder and calendaring activities, as discussed herein. In one example, any participant in the session can use a soft button in order to automatically prompt calendaring activities. In another example, the architecture can use pitch, rising pitch, various vocative chants, boundary tones, boundary conditions, delay, down step, pitch accents, or any modifications or hybrids of these elements, or any other suitable language processing parameter to achieve the intelligent calendaring activities being outlined herein. This includes proprietary characteristics (e.g., organically developed) that may be readily programmed into the architecture. For example, specific patterns, word exchanges, specific words, specific names, specific sounds, etc. can be programmed into an architecture to be one of the language processing parameters, which can be detected and subsequently used to make an intelligent calendaring decision for the participants.

Figure 2:
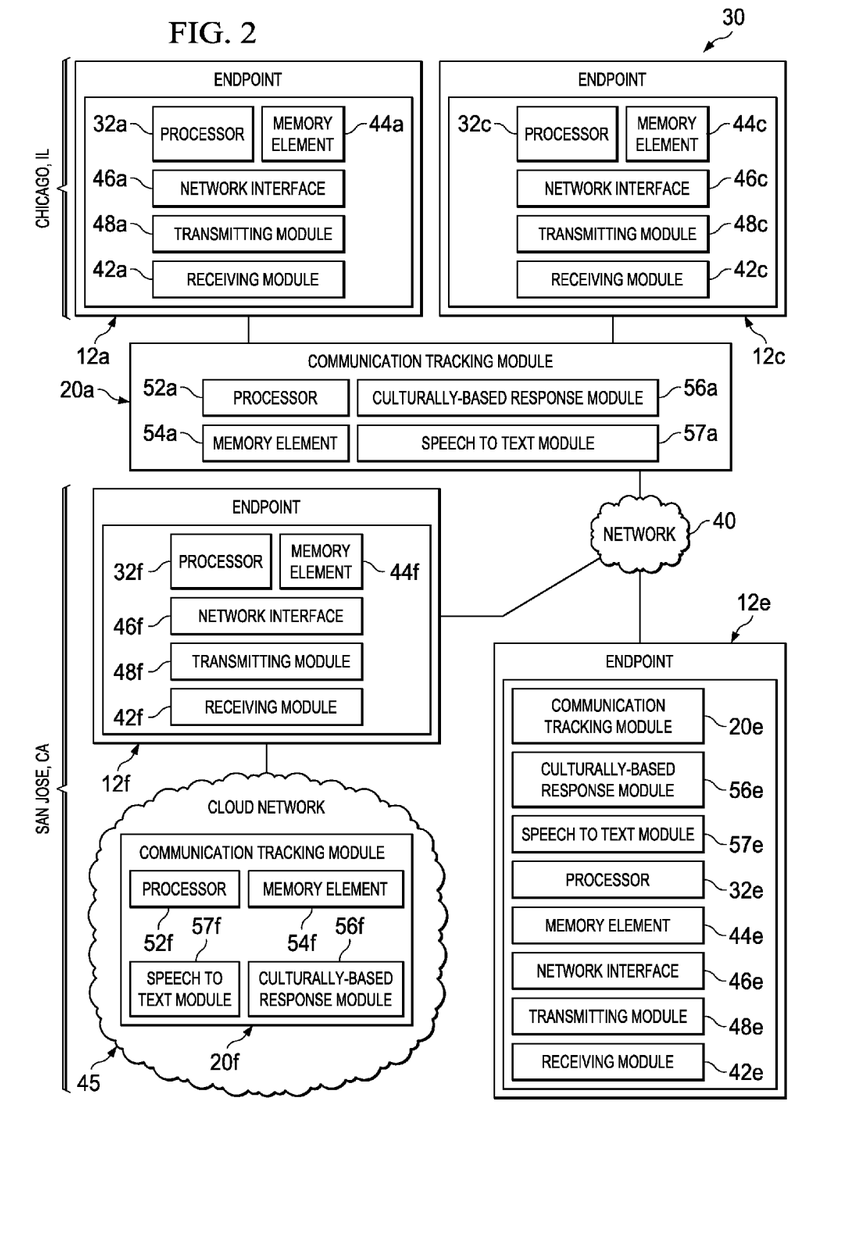
FIG. 2 is a simplified block diagram illustrating one possible set of example implementation details associated with one embodiment of the present disclosure.

Turning to FIG. 2, FIG. 2 is a simplified block diagram illustrating one possible set of implementation details associated with communication system 10. In this example, endpoints 12a and 12c are configured to interface with communication tracking module 20a, which is coupled to a network 40. Along similar rationales, a set of endpoints 12e and 12f are configured to interface with either communication tracking module 20a or 20f, which is provisioned within a cloud network 45. In one particular example, a given endpoint (such as 12e) includes a respective communication tracking module 20e, a culturally-based response module 56e, and a speech to text module 57e such that the endpoint can conduct (or at least share) some of the reminder, calendaring, etc. responsibilities, along with potentially assisting in identifying the triggers for initiating such activities.

In the particular implementation of FIG. 2, endpoints 12a, 12c, 12e, 12f include a respective processor 32a, 32c, 32e, 32f, a respective memory element 44a, 44c, 44e, 44f, a respective network interface 46a, 46c, 46e, 46f, a respective transmitting module 48a, 48c, 48e, 48f, and a respective receiving module 42a, 42c, 42e, 42f. Any one or more of these internal items of the endpoints may be consolidated or eliminated entirely, or varied considerably, where those modifications may be made based on particular communication needs, specific protocols, etc.

Networks 40 and 45 represent a series of points or nodes of interconnected communication paths for receiving and transmitting packets of information that propagate through communication system 10. Networks 40 and 45 offer a communicative interface between the endpoints and other network elements (e.g., communication tracking modules 20a, 20f), and may be any local area network (LAN), Intranet, extranet, wireless local area network (WLAN), metropolitan area network (MAN), wide area network (WAN), virtual private network (VPN), or any other appropriate architecture or system that facilitates communications in a network environment. Networks 40 and 45 may implement a UDP/IP connection and use a TCP/IP communication protocol in particular embodiments of the present disclosure. However, networks 40 and 45 may alternatively implement any other suitable communication protocol for transmitting and receiving data packets within communication system 10. Networks 40 and 45 may foster any communications involving services, content, video, voice, or data more generally, as it is exchanged between end users and various network elements.

In one example implementation, communication tracking modules 20a, 20f include respective processors 52a, 52f, respective memory elements 54a, 54f, respective speech to text modules 57a, 57f, and respective culturally-based response modules 56a, 56f. Communication tracking modules 20a, 20f can be aware of (and potentially store) information about who is speaking, and/or who is being spoken to during the session. Communication tracking modules 20a, 20f can selectively trigger calendaring activities for various end users using any suitable analysis of the audio/video/media inputs.

In one particular instance, communication tracking modules 20a, 20f are network elements configured to exchange data in a network environment such that the intelligent language processing-based calendaring activities discussed herein is achieved. As used herein in this Specification, the term 'network element' is meant to encompass various types of routers, switches, gateways, bridges, loadbalancers, firewalls, servers, inline service nodes, proxies, processors, modules, or any other suitable device, network appliance, component, proprietary element, or object operable to exchange information in a network environment. The network element may include appropriate processors, memory elements, hardware and/or software to support (or otherwise execute) the activities associated with language processing-based calendaring, as outlined herein. Moreover, the network element may include any suitable components, modules, interfaces, or objects that facilitate the operations thereof. This may be inclusive of appropriate algorithms and communication protocols that allow for the effective exchange of data or information.

In a specific implementation, communication tracking modules 20a, 20f include software to achieve (or to foster) the language processing-based calendaring operations, as outlined herein in this document. Furthermore, in one example, communication tracking modules 20a, 20f can have an internal structure (e.g., have a processor, a memory element, etc.) to facilitate some of the operations described herein. In other embodiments, all of these calendaring activities may be provided externally to these elements, or included in some other network element to achieve this intended functionality. Alternatively, any other network element can include this software (or reciprocating software) that can coordinate with communication tracking modules 20a, 20f in order to achieve the operations, as outlined herein.

Before turning to some of the additional operations of communication system 10, a brief discussion is provided about some of the infrastructure of FIG. 1. In the example of FIG. 1, each endpoint 12a-f is fitted discreetly along a desk and, further, is proximate to its associated participant or end user. Such endpoints could be provided in any other suitable location, as FIG. 1 only offers one of a multitude of possible implementations for the concepts presented herein. Note that the numerical and letter designations assigned to the endpoints do not connote any type of hierarchy; the designations are arbitrary and have been used for purposes of teaching only. These designations should not be construed in any way to limit their capabilities, functionalities, or applications in the potential environments that may benefit from the features of communication system 10.

In a particular example implementation, endpoints 12a-f are endpoints, which can assist in receiving and communicating video, audio, and/or multimedia data. Other types of endpoints are certainly within the broad scope of the outlined concept, and some of these example endpoints are further described below. Each endpoint 12a-f can be configured to interface with a respective multipoint manager element, such as communication tracking module 20a, which can be configured to coordinate and to process information being transmitted by the end users.

As illustrated in FIG. 1, a number of cameras 14a-14c and displays 15a-15c are provided for the conference. Displays 15a-15c can be configured to render images to be seen by the end users and, in this particular example, reflect a three-display design (e.g., a 'triple'). Note that as used herein in this specification, the term 'display' is meant to connote any element that is capable of rendering an image during a video conference. This would necessarily be inclusive of any panel, screen, Telepresence display or wall, computer display, plasma element, television, monitor, or any other suitable surface or element that is capable of such a rendering.

In particular implementations, the components of communication system 10 may use specialized applications and hardware to create a system that can leverage a network. Communication system 10 can use Internet protocol (IP) technology and, further, can run on an integrated voice, video, and data network. The system can also support high quality, real-time voice, and video communications using broadband connections. It can further offer capabilities for ensuring quality of service (QoS), security, reliability, and high availability for high-bandwidth applications such as video. Power and Ethernet connections for all end users can be provided. Participants can use their laptops to access data for the meeting, join a meeting place protocol or a Web session, or stay connected to other applications throughout the meeting.

Endpoints 12a-f may be used by someone wishing to participate in a video conference, an audio conference, an e-mail conference, an instant messaging conference, etc. in communication system 10. The broad term 'endpoint' may be inclusive of devices used to initiate a communication, such as a switch, a console, a proprietary endpoint, a telephone, a mobile phone, a bridge, a computer, a personal digital assistant (PDA), a laptop or electronic notebook, an i-Phone, an iPad, a Google Droid, any other type of smartphone, or any other device, component, element, or object capable of initiating voice, audio, or data exchanges within communication system 10.

Endpoints 12a-f may also be inclusive of a suitable interface to an end user, such as a microphone, a display, or a keyboard or other terminal equipment. Endpoints 12a-f may also include any device that seeks to initiate a communication on behalf of another entity or element, such as a program, a database, or any other component, device, element, or object capable of initiating a voice or a data exchange within communication system 10. Data, as used herein, refers to any type of video, numeric, voice, or script data, or any type of source or object code, or any other suitable information in any appropriate format that may be communicated from one point to another. Additional details relating to endpoints 12a-f are provided below with reference to FIG. 2.

In operation, communication tracking module 20a can be configured to establish, or to foster a session between one or more end users, which may be located in various other sites and locations. Communication tracking module 20a can also coordinate and process various policies involving endpoints 12a-f. In general, communication tracking module 20a may communicate with endpoints 12a-f through any standard or proprietary conference control protocol. Communication tracking module 20a includes a switching component that determines which signals are to be routed to individual endpoints 12a-f. Communication tracking module 20a is configured to determine how individual end users are seen by others involved in the video conference. Furthermore, communication tracking module 20a can control the timing and coordination of this activity. Communication tracking module 20a can also include a media layer that can copy information or data, which can be subsequently retransmitted or simply forwarded along to one or more endpoints 12a-f.

Note that in certain example implementations, the language processing-based calendaring activities outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Hence, any of the devices illustrated in the preceding FIGURES may include a processor that can execute software or an algorithm to perform the calendaring activities, as discussed in this Specification. Furthermore, communication tracking modules 20a, 20f can include memory elements for storing information to be used in achieving the intelligent calendaring activities, as outlined herein. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, table, cache, key, etc.) should be construed as being encompassed within the broad term 'memory element.' Similarly, any of the potential processing elements, modules, and machines described in this Specification should be construed as being encompassed within the broad term 'processor.'

Figure 3:
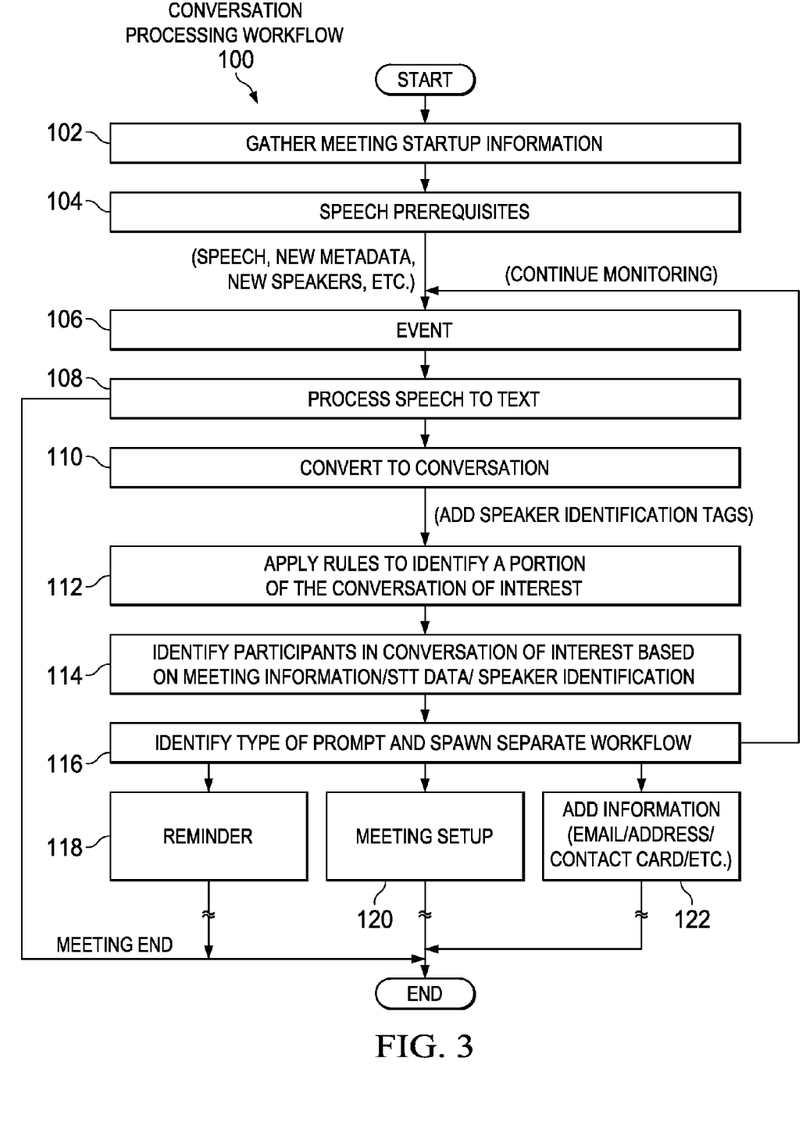
FIG. 3 is a simplified flowchart illustrating example operations associated with one embodiment of the communication system.

FIG. 3 is a simplified flowchart 100 illustrating one potential operation associated with an embodiment of communication system 10. This particular flow may begin at 102, where meeting startup information is gathered. Hence, in this particular example, meeting startup information can be provided at the outset of a session. This information can include data related to participants, an agenda, etc., along with updates associated with attendees (as they join the meeting), information about video endpoints, nodes, speaker identifiers (IDs), etc. For example, user IDs, participant names, job titles, e-mail addresses, symbols, pictures, proper names, speaker identifications, graphics, avatars, or any other suitable identifier is collected. [Note that the term 'identifier' is a broad term that includes all of these possibilities, and others that can suitably identify a given participant, endpoint, etc.] The identifier can be suitably stored it in any appropriate location (e.g., at communication tracking module 20a). The identifier collection activity can be performed manually by individual participants, by the endpoints themselves, or automatically provided by the architecture (e.g., through software provisioned in the architecture, through communication tracking module 20a, etc.).

At 104, speech prerequisites are provided. These can include any suitable objects such as speech itself, new metadata, new speakers, etc. Moreover, in terms of the speech processing itself, during the session, communication tracking module 20a has the intelligence to account for accents, language translation, affirmative/negative keywords, dialects, etc. In addition, communication tracking module 20a can tailor its evaluations to be culture specific.

As the conversation is being monitored, an event is identified at 106. In terms of events, new speech emanating from the session can be interpreted using any suitable protocol (e.g., speech-to-text (STT)). Other events can include new participants entering the session, leaving the session, changing their mode of communication (e.g., changing the devices, altering their communication pathways, adjusting their bandwidth consumption, bitrates, etc.). Communication system 10 can detect which participants are speaking, writing, etc. (in real-time) and which are being addressed and, further, use this information in order to trigger any number of calendar entries, events, reminders, etc.

At 108, the speech to text is processed. At 110, this information is converted to a conversation, where speaker identification tags are added. Rules are applied at 112 to identify a portion of the conversation of interest. At 114, the participants are identified based, at least in part, on meeting information, speech to text data, speaker identification, etc. In 116, a type of prompt is identified, where a separate workflow can be spawned. The workflows can include reminders 118, meeting set-up 120, or any information activity 122 (e.g., e-mail/address/contact/etc.).

Note the architecture can readily use speaker identification based on voice/speech patterns to determine participants and use this information when deciding whom to trigger the calendaring for (or for the specific participants that are in a subset of the larger conversation). For example, when a person asks a question such as:

Person 1: Is it your anniversary tomorrow?
Person 2: Yes.

Person 2 may be joining from an endpoint/conference room that includes seven people. Speaker identification can be used to narrow the trigger down to a specific person in that room. Furthermore, this could additionally be extended to a use case for an approval without the need to actually sign a document or send an email. Consider the following example:

Person 1: Do you approve this design/merger/hiring decision?

Person 3: Yes. (Note that the system does nothing since the pre-meeting information/agenda listed Person 2 as the approver.)

Person 2: I agree.

The system can then auto-sign a document with the approver's digital print or trigger a pop-up to confirm the action of approval. Some of these options can be designated through simple user preferences.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures. Additionally, although described with reference to particular scenarios, where a particular module, such as a vocative detector module, is provided within a network element, these modules can be provided externally, or consolidated and/or combined in any suitable fashion. In certain instances, such modules may be provided in a single proprietary unit.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. It is also imperative to note that communication system 10 is entirely language independent. Different languages place different emphases and/or different stresses on their words. Moreover, even within the same language, different people have distinct dialects, language, patterns, and/or various ways of stating the same name, the same location, etc. Communication system 10 can readily be used in any such language environments, as the teachings of the present disclosure are equally applicable to all such alternatives and permutations.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:
1. A method, comprising:
creating a vocabulary of terms that indicate culturally affirmative responses;
monitoring a conversation associated with a communication session involving a first endpoint and a second endpoint, wherein the communication session involves at least two participants;

identifying a portion of the conversation that includes an exchange between a first participant and a second participant;

evaluating first data associated with the first participant during the exchange;

evaluating second data associated with the second participant during the exchange;

determining an identity of the first participant using voice/speech pattern recognition;

determining an identity of the second participant using voice/speech pattern recognition;

determining historical speech patterns and behaviors of the first and second participants, wherein the determined historical speech patterns and behaviors are used to perform the identifying and wherein the speech patterns include at least one of pitch, rising pitch, various vocative chants, boundary tones, boundary conditions, delay, down step, and pitch accents;

when the first data and the second data associated with the first participant and the second participant during the exchange include information for a future meeting along with a culturally affirmative response, evaluating a first availability of the first participant, evaluating a second availability of the second participant, and initiating a calendar entry for the future meeting based, at least in part, on the first availability and the second availability, the respective identities of the first and second participants, and the determined historical speech patterns and behaviors; and when the first data and the second data associated with the first participant and the second participant during the exchange include information for a reminder along with a culturally affirmative response, initiating a reminder entry based, at least in part, on the first data and the second data and the identities of the first and second participants; and when the first data and the second data associated with the first participant and the second participant during the exchange include information indicating approval of a document by one of the first and second participants, prompting at least one of the first and second participants to approve an auto-signature of the document based, at least in part, on the first data and the second data and the identities of the first and second participants;

wherein the method further comprises assigning one or more follow-up items to a third endpoint that was not initially involved in the communication session, wherein the assigning is based, at least in part, on the first data and the second data associated with the first participant and the second participant during the exchange.

2. The method of claim 1, wherein the communication session is a selected one of a group of sessions, the group consisting of:
   a) a video conference session;
   b) an audio conference session;
   c) an instant messaging session; and
   d) an e-mail session.

3. The method of claim 1, further comprising:
performing a speech to text analysis on at least a portion of the communication session in order to determine whether to initiate the calendaring activity.

4. The method of claim 1, further comprising:
providing a pop-up window to offer a list of calendar options to the first participant and the second participant based, at least in part, on the first data and the second data associated with the first participant and the second participant during the exchange.

5. The method of claim 1, wherein heuristics are used in order to determine whether to initiate the calendaring activity.

6. The method of claim 1, wherein previously defined speech patterns are used in order to determine whether to initiate the calendaring activity.

7. Non-transitory media that includes code for execution and when executed by a processor operable to perform operations comprising:

creating a vocabulary of terms that indicate culturally affirmative responses;

monitoring a conversation associated with a communication session involving a first endpoint and a second endpoint, wherein the communication session involves at least two participants;

identifying a portion of the conversation that includes an exchange between a first participant and a second participant;

evaluating first data associated with the first participant during the exchange;

evaluating second data associated with the second participant during the exchange;

determining an identity of the first participant using voice/speech pattern recognition;

determining an identity of the second participant using voice/speech pattern recognition;

determining historical speech patterns and behaviors of the first and second participants, wherein the determined historical speech patterns and behaviors are used to perform the identifying and wherein the speech patterns include at least one of pitch, rising pitch, various vocative chants, boundary tones, boundary conditions, delay, down step, and pitch accents;

when the first data and the second data associated with the first participant and the second participant during the exchange include information for a future meeting along with a culturally affirmative response, evaluating a first availability of the first participant, evaluating a second availability of the second participant, and initiating a calendar entry for the future meeting based, at least in part, on the first availability and the second availability, the respective identities of the first and second participants, and the determined historical speech patterns and behaviors; and when the first data and the second data associated with the first participant and the second participant during the exchange include information for a reminder along with a culturally affirmative response, initiating a reminder entry based, at least in part, on the first data and the second data and the identities of the first and second participants; and when the first data and the second data associated with the first participant and the second participant during the exchange include information indicating approval of a document by one of the first and second participants, prompting at least one of the first and second participants to approve an auto-signature of the document based, at least in part, on the first data and the second data and the identities of the first and second participants;

wherein the operations further comprise assigning one or more follow-up items to a third endpoint that was not initially involved in the communication session, wherein the assigning is based, at least in part, on the first data and the second data associated with the first participant and the second participant during the exchange.

8. The media of claim 7, wherein the communication session is a selected one of a group of sessions, the group consisting of:
   a) a video conference session;
   b) an audio conference session;
   c) an instant messaging session; and
   d) an e-mail session.

9. The media of claim 7, the operations further comprising:
   performing a speech to text analysis on at least a portion of the communication session in order to determine whether to initiate the calendaring activity.

10. The media of claim 7, the operations further comprising:
    providing a pop-up window to offer a list of calendar options to the first participant and the second participant based, at least in part, on the first data and the second data associated with the first participant and the second participant during the exchange.

11. The media of claim 7, wherein heuristics are used in order to determine whether to initiate the calendaring activity.

12. The media of claim 7, wherein previously defined speech patterns are used in order to determine whether to initiate the calendaring activity.

13. An apparatus, comprising:
    a communication tracking module that includes a culturally-based response module that includes a vocabulary of terms that indicate culturally affirmative responses, a memory element configured to store data, and a processor operable to execute instructions associated with the data, wherein the processor and the memory element cooperate such that the communication tracking module is configured for:
        monitoring a conversation associated with a communication session involving a first endpoint and a second endpoint, wherein the communication session involves at least two participants;
        identifying a portion of the conversation that includes an exchange between a first participant and a second participant;
        evaluating first data associated with the first participant during the exchange;
        evaluating second data associated with the second participant during the exchange;
        determining an identity of the first participant using voice/speech pattern recognition;
        determining an identity of the second participant using voice/speech pattern recognition;
        determining historical speech patterns and behaviors of the first and second participants, wherein the determined historical speech patterns and behaviors are used to perform the identifying and wherein the speech patterns include at least one of pitch, rising pitch, various vocative chants, boundary tones, boundary conditions, delay, down step, and pitch accents;
    when the first data and the second data associated with the first participant and the second participant during the exchange include information for a future meeting along with a culturally affirmative response, evaluating a first availability of the first participant, evaluating a second availability of the second participant, and initiating a calendar entry for the future meeting based, at least in part, on the first availability and the second availability, the respective identities of the first and second participants, and the determined historical speech patterns and behaviors; and
    when the first data and the second data associated with the first participant and the second participant during the exchange include information for a reminder along with a culturally affirmative response, initiating a reminder entry based, at least in part, on the first data and the second data and the identities of the first and second participants; and
    when the first data and the second data associated with the first participant and the second participant during the exchange include information indicating approval of a document by one of the first and second participants, prompting at least one of the first and second participants to approve an auto-signature of the document based, at least in part, on the first data and the second data and the identities of the first and second participants;
    wherein the configuration tracking module is further configured for assigning one or more follow-up items to a third endpoint that was not initially involved in the communication session, wherein the assigning is based, at least in part, on the first data and the second data associated with the first participant and the second participant during the exchange.

14. The apparatus of claim 13, wherein the communication tracking module is further configured for:
    performing a speech to text analysis on at least a portion of the communication session in order to determine whether to initiate the calendaring activity.

15. The apparatus of claim 13, wherein the communication tracking module is further configured for:
    providing a pop-up window to offer a list of calendar options to the first participant and the second participant based, at least in part, on the first data and the second data associated with the first participant and the second participant during the exchange.

16. The method of claim 1, further comprising assigning information to contact information associated with the first participant or the second participant based, at least in part, on the first data and the second data associated with the first participant and the second participant during the exchange.

* * * * *